United States Patent
Lee et al.

(10) Patent No.: US 12,063,307 B2
(45) Date of Patent: Aug. 13, 2024

(54) CONTRACT APPARATUS AND METHOD OF BLOCKCHAIN USING LOCATION INFORMATION

(71) Applicants: Cy2code Co. Ltd, Seoul (KR); Sang Yub Lee, Seoul (KR); So Dam Song, Seoul (KR); Do Kyung Rhee, Yongin-si (KR)

(72) Inventors: Sang Yub Lee, Seoul (KR); So Dam Song, Seoul (KR); Do Kyung Rhee, Yongin-si (KR); Byeong Yong Rhee, Yongin-si (KR)

(73) Assignee: CY2CODE CO. LTD, Seoul (KR)

( * ) Notice: Subject to any disclaimer, the term of this patent is extended or adjusted under 35 U.S.C. 154(b) by 372 days.

(21) Appl. No.: 17/293,462

(22) PCT Filed: Oct. 16, 2019

(86) PCT No.: PCT/KR2019/013597
§ 371 (c)(1),
(2) Date: May 12, 2021

(87) PCT Pub. No.: WO2020/101190
PCT Pub. Date: May 22, 2020

(65) Prior Publication Data
US 2021/0409225 A1 Dec. 30, 2021

(30) Foreign Application Priority Data
Nov. 13, 2018 (KR) .......................... 10-2018-0139033

(51) Int. Cl.
*H04L 9/32* (2006.01)
*G06F 16/23* (2019.01)
*G06Q 30/018* (2023.01)

(52) U.S. Cl.
CPC ........ *H04L 9/3239* (2013.01); *G06F 16/2315* (2019.01); *G06Q 30/018* (2013.01); *G06Q 2220/00* (2013.01)

(58) Field of Classification Search
CPC ....... H04L 9/3239; H04L 9/50; H04L 63/126; H04L 67/52; H04L 9/0643;
(Continued)

(56) References Cited

U.S. PATENT DOCUMENTS

2008/0209506 A1* 8/2008 Ghai ..................... G06F 21/604
726/16
2014/0095450 A1* 4/2014 Marwah .................. G06F 16/21
707/668
2019/0347654 A1* 11/2019 Lu ........................ G06Q 20/405

FOREIGN PATENT DOCUMENTS

KR 101407047 B1 8/2014
KR 101789298 B1 11/2017
(Continued)

OTHER PUBLICATIONS

International Search Report mailed Feb. 6, 2020 for PCT/KR2019/013597.
(Continued)

*Primary Examiner* — Abiy Getachew
(74) *Attorney, Agent, or Firm* — CANTOR COLBURN LLP

(57) ABSTRACT

Disclosed are blockchain type contract terminal and method using position information. There are provided: an input module that is inputted with a contract term regarding an object of contract; a position information collection module that collects, in real time, position information of the object at the time of contract; a contract creation module that creates a contract by using the contract term inputted by the input module and the position information at the time of contract collected in real time by the position information
(Continued)

collection module; a blockchain creation module that encrypts the contract created by the contract creation module to create a blockchain; and a blockchain distributed storage control module that transmits the blockchain created at the blockchain creation module to another terminal in a P2P manner for storing on a network in a distributed manner.

2 Claims, 2 Drawing Sheets

(58) Field of Classification Search
CPC ............ H04L 67/1097; G06F 16/2315; G06Q 30/018; G06Q 2220/00; G06Q 20/0655; G06Q 20/223; G06Q 30/0609; G06Q 10/10; G06Q 20/3224
See application file for complete search history.

(56) References Cited

FOREIGN PATENT DOCUMENTS

| | | |
|---|---|---|
| KR | 101880175 B1 | 7/2018 |
| KR | 101886283 B1 | 8/2018 |
| WO | 2017145018 A1 | 8/2017 |
| WO | WO-2017223470 A1 * 12/2017 | ............. G06F 21/00 |

OTHER PUBLICATIONS

Written Opinion and International Preliminary Report mailed May 18, 2021 for PCT/KR2019/013597.

\* cited by examiner

CONTRACT APPARATUS AND METHOD OF BLOCKCHAIN USING LOCATION INFORMATION

CROSS-REFERENCE TO RELATED APPLICATIONS

This application is a national stage application of International Patent Application No. PCT/KR2019/013597 filed on Oct. 16, 2019, which claims priority to Korean Patent Application No. 10-2018-0139033 filed on Nov. 13, 2018, the entire contents of which are incorporated by reference herein.

TECHNICAL FIELD

The present disclosure relates to blockchain type contract terminal and method, and more specifically, to blockchain type contract terminal and method using position information.

BACKGROUND

In recent years, the technological value of the blockchain has increased, and its marketability and technological security are being newly evaluated.

Unlike a centralized system such as a specific server, blockchain is a distributed system and has a very robust structure against the risk of tampering or hacking.

However, when a contract is stored on the related blockchain, only the timestamp, which is information on the time of transaction is stored, and other information is not stored.

Since it is not possible to confirm information other than the time of transaction from the contract stored on the related blockchain, it is not easy to determine whether or not the contract itself is original or whether or not it is tampered with.

Therefore, it is necessary for the blockchain technology to have a means for strengthening the security of the contract itself.

SUMMARY

An object of the present disclosure is to provide a blockchain type contract terminal using position information.

An object of the present disclosure is to provide a blockchain type contract method using position information.

A blockchain type contract terminal using position information according to the object of the present disclosure described above may be configured to include: an input module that is inputted with a contract term regarding an object of contract; a position information collection module that collects, in real time, position information of the object at the time of contract; a contract creation module that creates a contract by using the contract term inputted by the input module and the position information at the time of contract collected in real time by the position information collection module; a blockchain creation module that encrypts the contract created by the contract creation module to create a blockchain; and a blockchain distributed storage control module that transmits the blockchain created at the blockchain creation module to another terminal in a P2P manner for storing on a network in a distributed manner.

In addition, the blockchain creation module may be configured to encrypt each block of the blockchain using a hash function.

A blockchain type contract method using position information according to another object of the present disclosure described above may be configured to include: inputting, by an input module, a contract term regarding an object of contract; collecting, by a position information collection module, position information of the object at a time of contract in real time; creating, by a contract creation module, a contract by using the contract term inputted by the input module and the position information at the time of contract collected in real time by the position information collection module; encrypting, by a blockchain creation module, the contract created by the contract creation module to create a blockchain; and transmitting, by a blockchain distributed storage control module, the blockchain created at the blockchain creation module to another terminal in a P2P manner for storing on a network in a distributed manner.

In this example, the encrypting, by the blockchain creation module, the contract created by the contract creation module to create the blockchain may be configured to encrypt each block of the blockchain using a hash function.

According to the blockchain type contract terminal and method using the position information described above, the position information of the contracting party at the time of contract, the current position information of the contract object, and the like are automatically collected and stored on the blockchain together with the contract, and accordingly, it is possible to determine whether or not the contract itself is authentic or original, and improve the effect of security thereof.

In addition, it is possible to find the position of a lost object of contract by tracking and collecting the position information of the object of contract.

DETAILED DESCRIPTION OF THE DISCLOSURE

Figure 1:
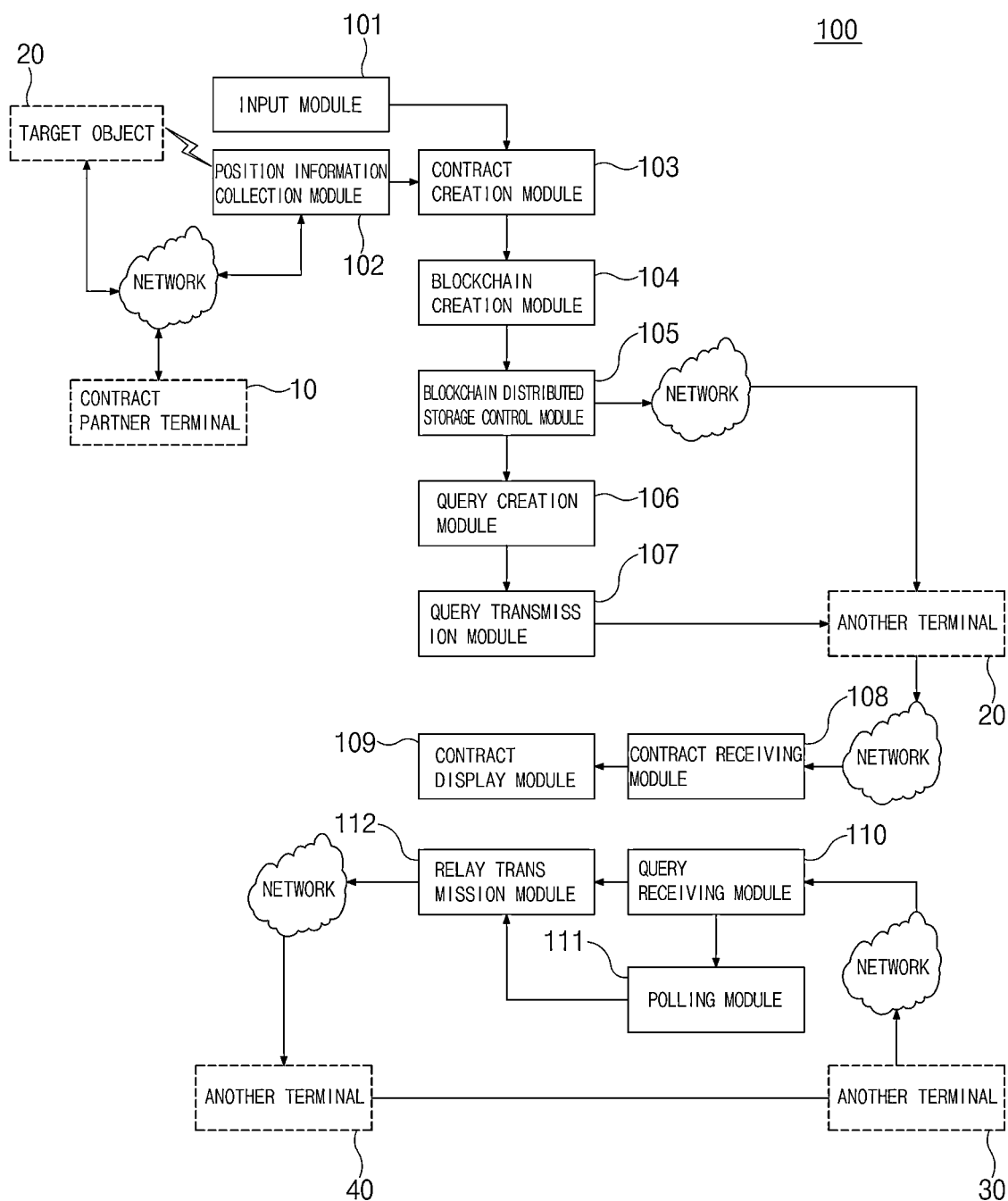
FIG. 1 is a block diagram of a blockchain type contract terminal using position information according to an embodiment of the present disclosure.

Various modifications may be made to exemplary embodiments of the present disclosure, and certain exemplary embodiments will be described below in detail with reference to attached drawings. However, it should be understood that the disclosure is not to be limited to the specific embodiments, but includes all modifications, equivalents, and alternatives falling within the spirit and scope of the disclosure. The like reference numerals are used for similar elements in describing each of the drawings.

The expression, "first," "second," and so on may be used in describing a variety of elements, but these elements should not be limited to the expression. The expressions are used only for the purpose of distinguishing one element from another. For example, without departing from the scope of the present disclosure, a first component may be referred to as a second component, and similarly, the second component may also be referred to as the first component. The expression "and/or" includes any combination of a plurality of associated listed items or any of a plurality of associated listed items.

It should be understood that when an element is referred to as being "connected" or "coupled" to another element, it may be directly connected or coupled to another element, with or without yet another element being present in between. On the other hand, it should be understood that when an element is referred to as being "directly connected" or "directly coupled" to another element, there are no other element present in between.

The expressions used herein are only for describing certain exemplary embodiments, and not intended to limit the scope of the disclosure. Unless otherwise specified, a singular expression includes a plural expression. The expression "comprise" or "have" as used herein is intended to designate an existence of steps, operations, elements, components or a combination of these, and accordingly, this should not be understood as precluding an existence or a possibility of adding one or more of other characteristics, numbers, steps, operations, elements, components or a combination of these.

Unless defined otherwise, all expressions used herein, including technical or scientific expressions, have the same meaning as commonly understood by one of ordinary skill in the art to which this disclosure belongs. Expressions such as those defined in commonly used dictionaries should be interpreted as having a meaning consistent with the meaning in the context of the relevant art and are to be interpreted as ideal or overly formal in meaning unless explicitly defined in the present application.

Hereinafter, preferred embodiments according to the present disclosure will be described in detail with reference to the accompanying drawings.

FIG. 1 is a block diagram of a blockchain type contract terminal using position information according to an embodiment of the present disclosure.

Referring to FIG. 1, a blockchain type contract terminal 100 using position information according to an embodiment of the present disclosure may be configured to include an input module 101, a position information collection module 102, a contract creation module 103, a blockchain creation module 104, a blockchain distributed storage control module 105, a query creation module 106, a query transmission module 107, a contract receiving module 108, a contract display module 109, a query receiving module 110, a polling module 111, and a relay transmission module 112.

Hereinafter, the detailed configuration will be described.

The input module 101 may be configured to be inputted with a contract term regarding an object of contract.

As used herein, the object of contract may refer to an object the contract is directed to, and may be baggage for a baggage contract, a bicycle for a bicycle sale contract, a pet for a pet sale contract, a door key for a real estate sale contract, and so on.

The contract term may include various contract-related details such as both parties to the contract, identities of the contractors, addresses of the contractors, accounts of the contractors, content of the contract, and so on.

The position information collection module 102 may be configured to collect in real time position information of the object of contract at the time of contract.

This may serve as the position information at the time of contract, of the object of contract that the consumer wants to track.

The position information collection module 102 may be configured to automatically collect position information of the baggage, the bicycle, the pet, the door key, and the like.

The position information collection module 102 may be configured to collect the position information from a GPS chip or the like attached to the object of contract such as the baggage, the bicycle, the pet, the door key, and the like, by using a sensor having a Bluetooth function.

In addition, the position information collection module 102 may be configured to collect the position information such as an IP address, GPS coordinates or the like of not only the object of contract, but also a contract partner terminal 10 of a contract partner.

The position information of the object of contract or the contract partner terminal 10 may be stored on a blockchain together with the contract.

Meanwhile, the position information collection module 102 may be configured to track and collect not only the position information at the time of contract, but also the continuous position information of the object of contract. In this case, even when an article as the object of contract is lost, its position can be accurately tracked and found.

The contract creation module 103 may be configured to create a contract by using the contract term inputted by the input module 101 and the position information at the time of contract collected in real time by the position information collection module 102.

The blockchain creation module 104 may be configured to encrypt the contract created by the contract creation module 103 to create a blockchain.

The blockchain creation module 104 may be configured to encrypt each block using a hash function.

The blockchain creation module 104 may be configured to store the contract in each block and store the user information, the digital signature, the position information of the object of contract and the position information of the contract partner terminal 10 at the time of contract, the timestamp at the time of the contract, and the like in the header of the block.

In this example, the user information may include an ID and a password of the user, the timestamp may include information on the date and time when the creation of the contract is completed and when the contract is stored, and the digital signature may include coordinate information for each pixel of the signature image of the user and history information according to an update of the timestamp.

In addition to the contract, the blockchain creation module 104 may continuously store the position information as it is tracked and collected, to continuously ensure the position information of the object of contract document even after the contract.

The blockchain distributed storage control module 105 may be configured to transmit the blockchain created at the blockchain creation module 104 to another terminal 20 in a P2P manner for storing on a network in a distributed manner. In this example, the another terminal 20 is another node terminal on the network, and may include a number of random terminals.

The query creation module 106 may be configured to create a query of the contract that the user wants to search. In this example, the query is a query for searching and loading the user's own contract that the user wants to find.

The query transmission module 107 may be configured to transmit the query created by the query creation module 106 to a predetermined another terminal 20. In this example, the query transmission module 107 may be configured to transmit a query for searching for a contract stored in a number of nodes on the network in a blockchain form in a distributed manner.

The contract receiving module 108 may be configured to receive a contract corresponding to the query from the another terminal 20. The another terminal 20 may be configured to search and provide the contract corresponding to the query by polling the blockchain.

The contract display module 109 may be configured to display the contract received at the contract receiving module 108.

The query receiving module 110 may be configured to receive a query for searching a certain contract from certain, another terminal 30.

The polling module 111 may be configured to poll the blockchain to read a contract corresponding to the query received at the query receiving module 110.

The relay transmission module 112 may be configured to relay the contract read from the polling module 111 to the terminal 30 that issued the query. It may be configured to relay through each node, and relay to the another terminal 30 that issued the query through another terminal 40.

Figure 2:
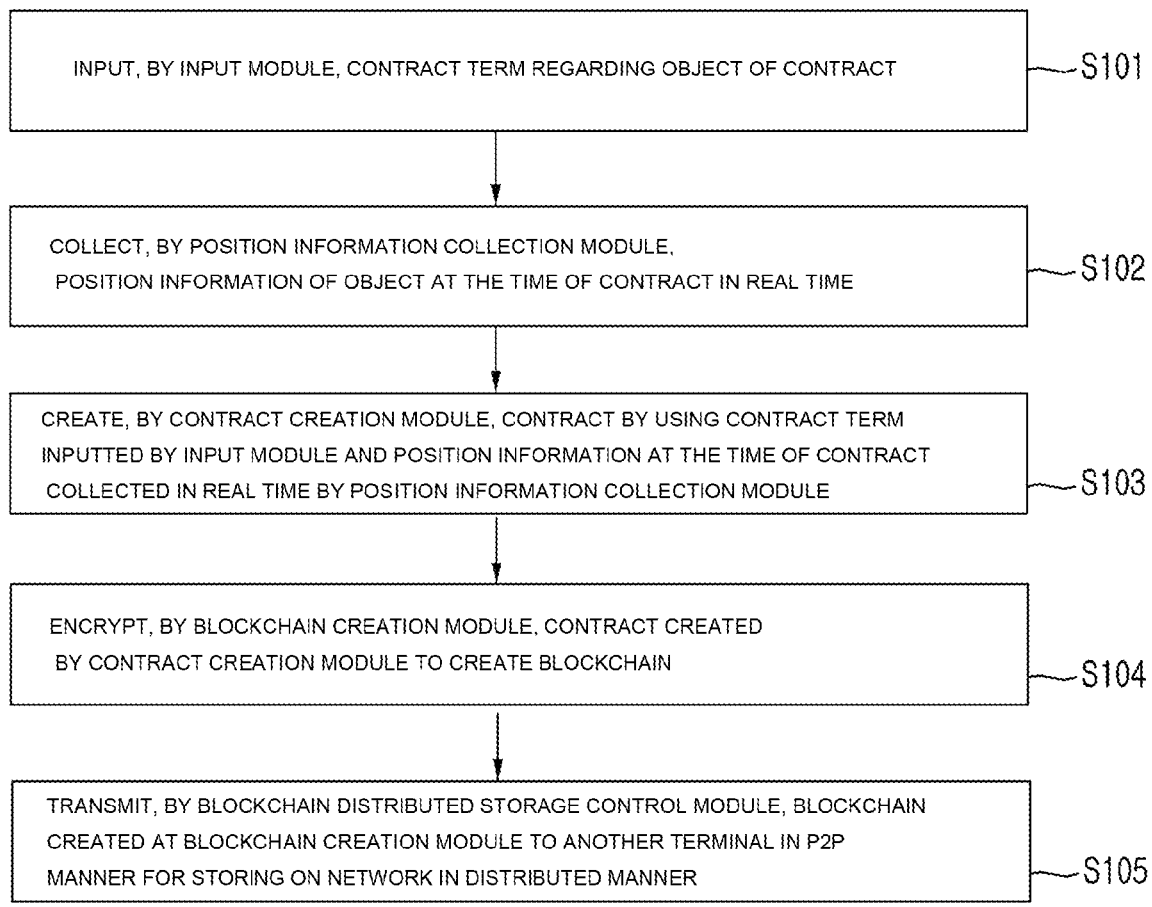
FIG. 2 is a flowchart of a blockchain type contract method using position information according to an embodiment of the present disclosure.

FIG. 2 is a flowchart of a blockchain type contract method using position information according to an embodiment of the present disclosure.

Referring to FIG. 2, the input module 101 is inputted with the contract term regarding the object of contract (S101).

Next, the position information collection module 102 collects the position information of the object at the time of contract in real time (S102).

Next, the contract creation module 103 creates the contract by using the contract term inputted by the input module 101 and the position information at the time of contract collected in real time by the position information collection module 102 (S103).

Next, the blockchain creation module 104 encrypts the contract created at the contract creation module 103 to create a blockchain (S104).

In this example, the blockchain creation module 104 may be configured to encrypt the previous block on the blockchain using a hash function in the contract.

Next, the blockchain distributed storage control module 105 transmits the blockchain created at the blockchain creation module 104 to the another terminal 20 in a P2P manner for storing on a network in a distributed manner (S105).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a blockchain type contract terminal and method, and can be applied to all industrial fields requiring a contract.

What is claimed is:

1. A blockchain type contract terminal using position information comprising:
   an input module that is inputted with a contract term regarding an object of contract;
   a position information collection module that collects, in real time, position information of the object and position information of a contract partner terminal at a time of contract;
   a contract creation module that creates a contract by using the contract term inputted by the input module and the position information of the object and the position information of the contract partner terminal at the time of contract collected in real time by the position information collection module;
   a blockchain creation module that encrypts the contract created by the contract creation module to create a blockchain;
   a blockchain distributed storage control module that transmits the blockchain created at the blockchain creation module to a first terminal in a P2P manner for storing on a network in a distributed manner;
   a query creation module that creates a query of the contract to search;
   a query transmission module that transmits the query created by the query creation module to the first terminal;
   a contract receiving module that receives the contract corresponding to the query from the first terminal;
   a contract display module that displays the contract received at the contract receiving module;
   a query receiving module that receives a query for searching a certain contract from a second terminal;
   a polling module that polls a blockchain to read the certain contract corresponding to the query received at the query receiving module; and
   a relay transmission module that relays the contract read from the polling module to the second terminal that issued the query,
   wherein the contract term includes both contractors of the contract, identities of the contractors, addresses of the contractors, accounts of the contractors, and content of the contract,
   wherein the position information collection module continuously tracks and collects the position information of the object of the contract,
   the blockchain creation module stores the contract in each block, user information, digital signature, the position information of the object of contract and the position information of the contract partner terminal at the time of contract, and timestamp at the time of the contract in a header of the block, and continuously stores the position information of the object after the time of the contract,
   wherein the user information includes an ID and a password of a user, the timestamp includes information on a date and time when the creation of the contract is completed and when the contract is stored, and the digital signature includes coordinate information for each pixel of a signature image of the user and history information according to an update of the timestamp,
   wherein the position information of the object of contract and the contract partner terminal are stored on the blockchain together with the contract.

2. The blockchain type contract terminal according to claim 1, wherein the blockchain creation module is configured to encrypt each block of the blockchain using a hash function.

* * * * *